US007195247B2

(12) United States Patent
Shu

(10) Patent No.: US 7,195,247 B2
(45) Date of Patent: Mar. 27, 2007

(54) TOOL JOINT

(76) Inventor: Zu-Shung Shu, No. 11, Alley 11, Lane 25, Kuo Chung 1st Road, Ta Li City, Taichung Hsien (TW)

( * ) Notice: Subject to any disclaimer, the term of this patent is extended or adjusted under 35 U.S.C. 154(b) by 0 days.

(21) Appl. No.: 11/042,458

(22) Filed: Jan. 25, 2005

(65) Prior Publication Data

US 2006/0163823 A1 Jul. 27, 2006

(51) Int. Cl.
*B23Q 5/22* (2006.01)

(52) U.S. Cl. .......................... 279/75; 408/240; 279/22; 279/81

(58) Field of Classification Search .................. 279/22, 279/29, 30, 71, 74, 75, 81, 82, 137; 408/240
See application file for complete search history.

(56) References Cited

U.S. PATENT DOCUMENTS 1,582,010 A * 4/1926 Hanson ........................ 279/75
2,143,010 A * 1/1939 Imblum ........................ 279/75
2,807,473 A * 9/1957 Kiehne ........................ 279/82
2,926,020 A * 2/1960 Dayton et al. ................ 279/75
3,583,715 A * 6/1971 Jahrl ............................ 279/75
4,231,581 A * 11/1980 Benedict ..................... 279/19.4
4,234,277 A * 11/1980 Benson et al. .............. 408/226
5,577,743 A * 11/1996 Kanaan et al. ................ 279/72
5,934,846 A * 8/1999 Ishii ........................... 408/141
5,996,452 A * 12/1999 Chiang ......................... 81/429
6,325,393 B1 * 12/2001 Chen et al. .................... 279/22
6,637,755 B2 * 10/2003 Chen et al. .................... 279/22
6,695,321 B2 * 2/2004 Bedi et al. ..................... 279/22
6,755,423 B2 * 6/2004 Chiu ............................ 279/30
6,935,637 B2 * 8/2005 Cantlon ........................ 279/75
2004/0026878 A1 * 2/2004 Chen et al. .................... 279/75
2004/0081523 A1 * 4/2004 Vasudeva et al. ........... 408/240

OTHER PUBLICATIONS

Taiwan Patent Publication No. M240311, Aug. 11, 2004, 16 pages.

* cited by examiner

*Primary Examiner*—Dana Ross
(74) *Attorney, Agent, or Firm*—Alan D. Kamrath; Nikolai & Mersereau, P.A.

(57) ABSTRACT

A joint is disclosed for connecting a handle with various bits. The joint includes an insert fit in the handle, a socket connected with the insert for receiving the bits, a first locking device installed on the socket for locking long bits to the socket and a second locking device installed on the socket for locking short bits to the socket.

19 Claims, 11 Drawing Sheets

TOOL JOINT

BACKGROUND OF INVENTION

1. Field of Invention

The present invention relates to a tool and, more particularly, to a tool joint for connecting a handle with various bits.

2. Related Prior Art

In Taiwanese Patent M2403 11, a conventional screwdriver is disclosed. This conventional screwdriver includes a handle 1, a bit 3 inserted in the handle 1, a locking device 2 installed in the handle 1 in order to lock the bit 3 and a controlling device 4 installed on the handle 1 in order to control the locking device 2. The locking device 2 includes a socket 22 with an axial passage 221 for receiving the bit 3 and two apertures communicated with the axial passage 221. An annular flange is formed on the socket 22. Two balls 222 are put in the apertures of the socket 22. A ring 21 is installed on the socket 22. The ring includes a tapered internal side 211 for pushing the balls 222. A spring 24 is installed on the socket 22. A C-clip is engaged with the socket 22 opposite to the annular flange. Thus, the spring 24 is compressed between the C-clip and the ring 21. Thus, the tapered internal side of the ring 21 pushes the balls 222 into contact with the bit 3. The controlling device 4 includes two wedges 42 provided between the ring 21 and the annular flange of the socket 22. Each wedge 42 is connected with a button 41. When the buttons 41 are pushed, the wedges 42 push the ring 21 from the annular flange of the socket 22. Thus, the tapered internal side of the ring 21 allows the balls 22 to leave the bit 3. However, a few problems are encountered in use of this conventional screwdriver. Firstly, short bits cannot be used, because the locking device 2 is located deep into the handle 1. Secondly, the bit 3 might accidentally be released, because the buttons 42 are pushed by mistake since the buttons 42 are located-close to an area of the handle 1 that is held.

The present invention is therefore intended to obviate or at least alleviate the problems encountered in prior art.

SUMMARY OF THE INVENTION

According to the present invention, a joint can connect a handle with various bits. The joint includes an insert fit in the handle, a socket connected with the insert for receiving the bits, a first locking device installed on the socket for locking long bits to the socket and a second locking device installed on the socket for locking short bits to the socket.

An advantage of the joint of the present invention is that it can connect the handle with long and short bits. Another advantage of the joint of the present invention is that it can connect the handle with some bits with two locking devices. Other advantages and novel features of the invention will become more apparent from the following detailed description in conjunction with the attached drawings.

BRIEF DESCRIPTION OF DRAWINGS

The present invention will be described via detailed illustration of embodiments referring to the drawings.

DETAILED DESCRIPTION OF EMBODIMENTS

Figure 1:
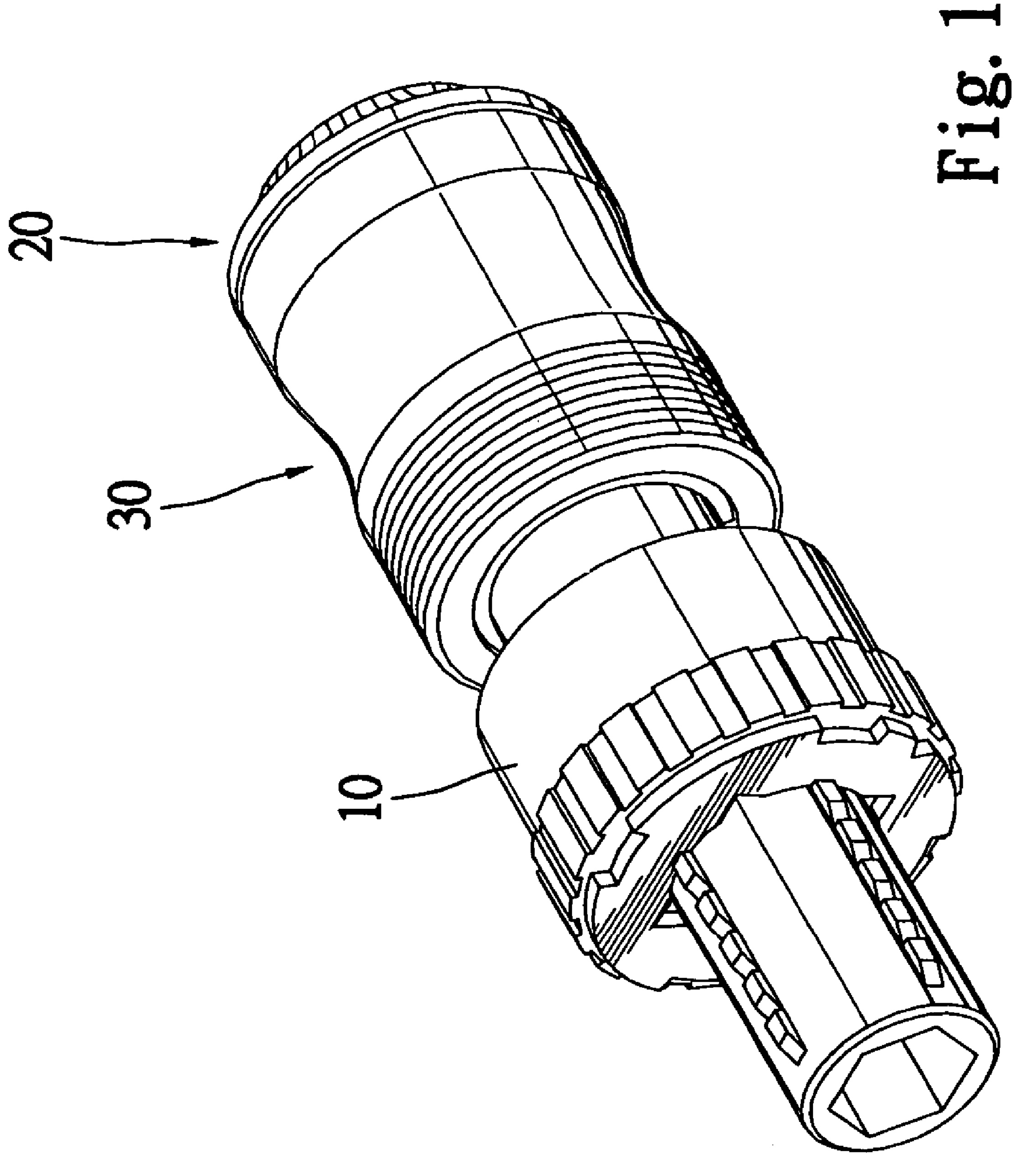
FIG. 1 is a perspective view of a tool joint according to a first embodiment of the present invention.

Referring to FIG. 1, according to a first embodiment of the present invention, a joint is shown to include a core 10, a locking device 30 and a locking device 20.

Figure 2:
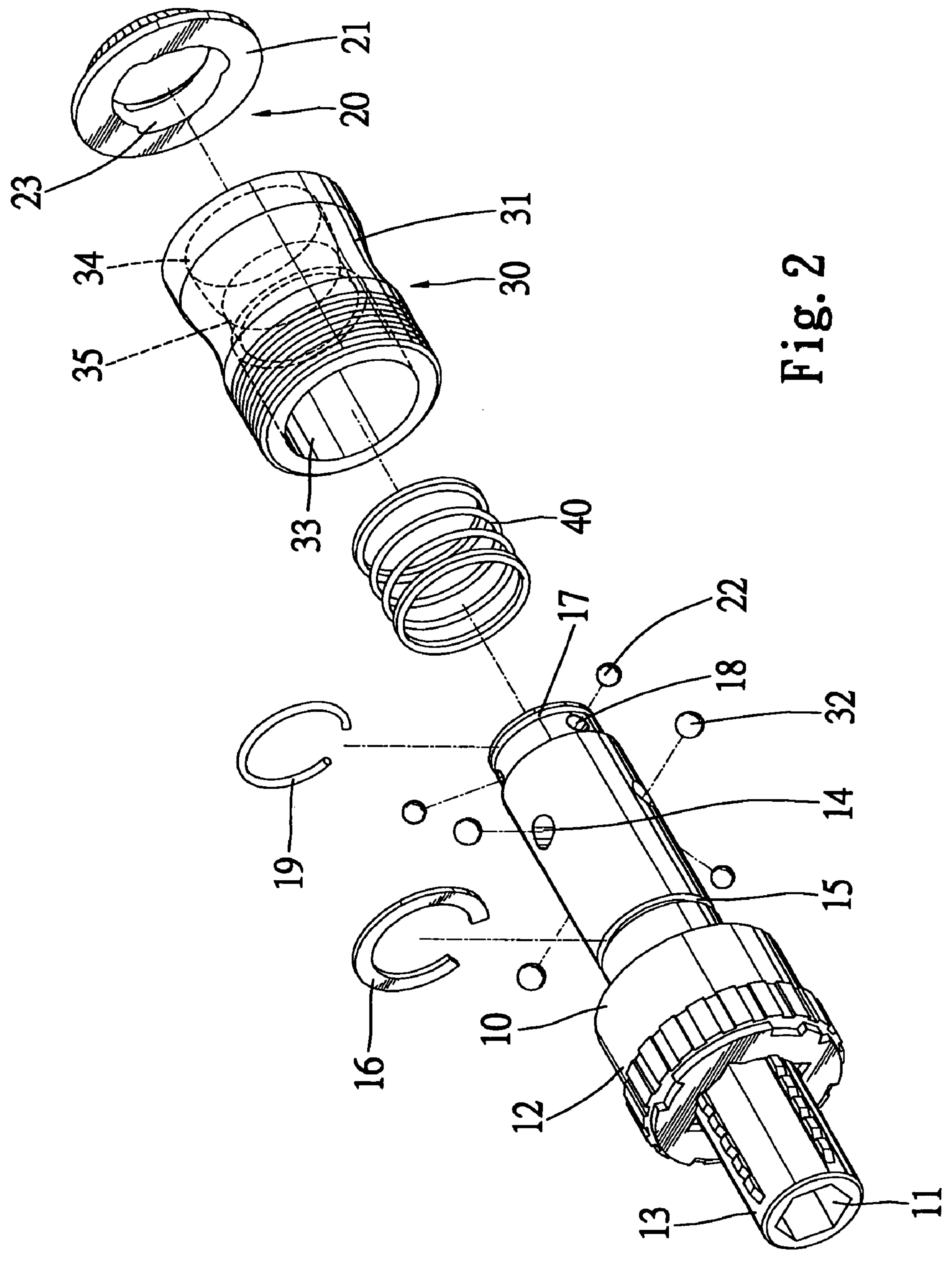
FIG. 2 is an exploded view of the tool joint shown in FIG. 1.

Referring to FIG. 2, the core 10 includes an insert 13 to be inserted in a handle (not shown) and a selective one-way socket 12 connected with the insert 13. An axial passage 11 extends through the insert 13 and the selective one-way socket 12.

The selective one-way socket 12 includes an annular groove 15 defined in the periphery, three apertures 14 communicated with the axial passage 11, three apertures 18 communicated with the axial passage 11 and an annular groove 17 defined in the periphery.

The locking device 30 includes three balls 32 put in the apertures 14 and a collar 31 for controlling the balls 32.

The locking device 20 includes three balls 22 put in the apertures 18 and a ring 21 for controlling the balls 22.

Figure 3:
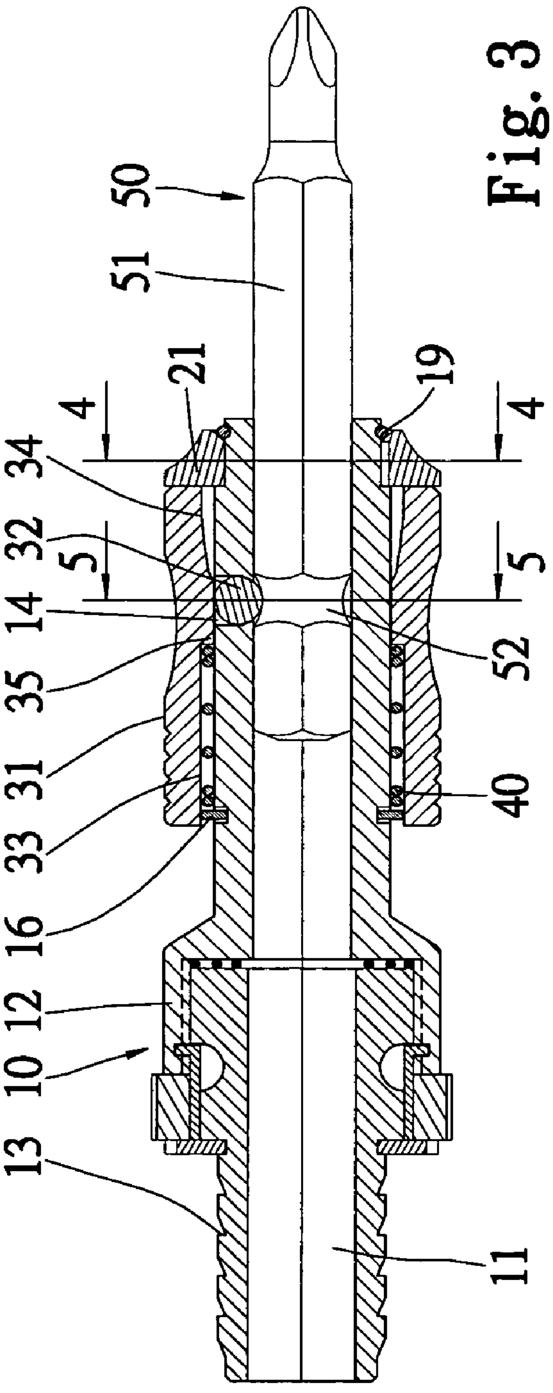
FIG. 3 is a cross-sectional view of the tool joint shown in FIG. 1.

Referring to FIG. 3, the collar 31 includes an internal side that is divided into a cylindrical section 33, a frustum-shaped section 34 and an annular shoulder 35 formed between the cylindrical section 33 and the frustum-shaped section 34. The frustum is defined by rotation of a curve instead of a straight line.

Figure 5:
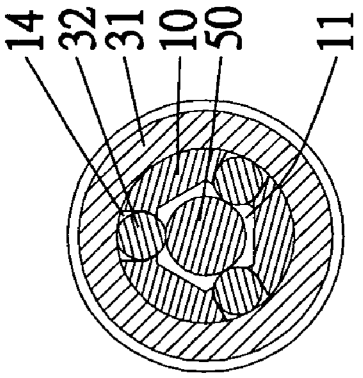
FIG. 5 is a cross-sectional view taken along a line 5—5 in FIG. 3.

A C-clip 16 is put in the annular groove 15. A spring 40 is installed on the socket 12 and against the C-clip 16. The collar 31 is installed on the socket 12. The spring 40 is compressed between the annular shoulder 35 and the C-clip 16. Referring to FIGS. 3 and 5, the annular shoulder 35 pushes the balls 32 into the axial passage 11. The balls 32 enter an annular groove 52 defined in a shank 51 of a bit 50. The ring 21 is installed on the socket 12 in a rotational manner. A C-clip 19 is put in the annular groove 17 in order to keep the ring 21 on the socket 12.

Figure 4:
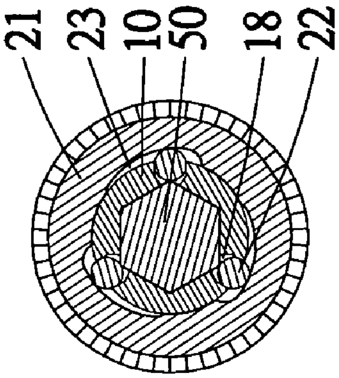
FIG. 4 is a cross-sectional view taken along a line 4—4 in FIG. 3.

Referring to FIG. 4, the ring 21 includes an internal side on which three slopes 23 are formed for pushing the balls 22 into the axial passage 11. The slopes 23 extend along a curve instead of a straight line.

Figures 6, 7, 8:
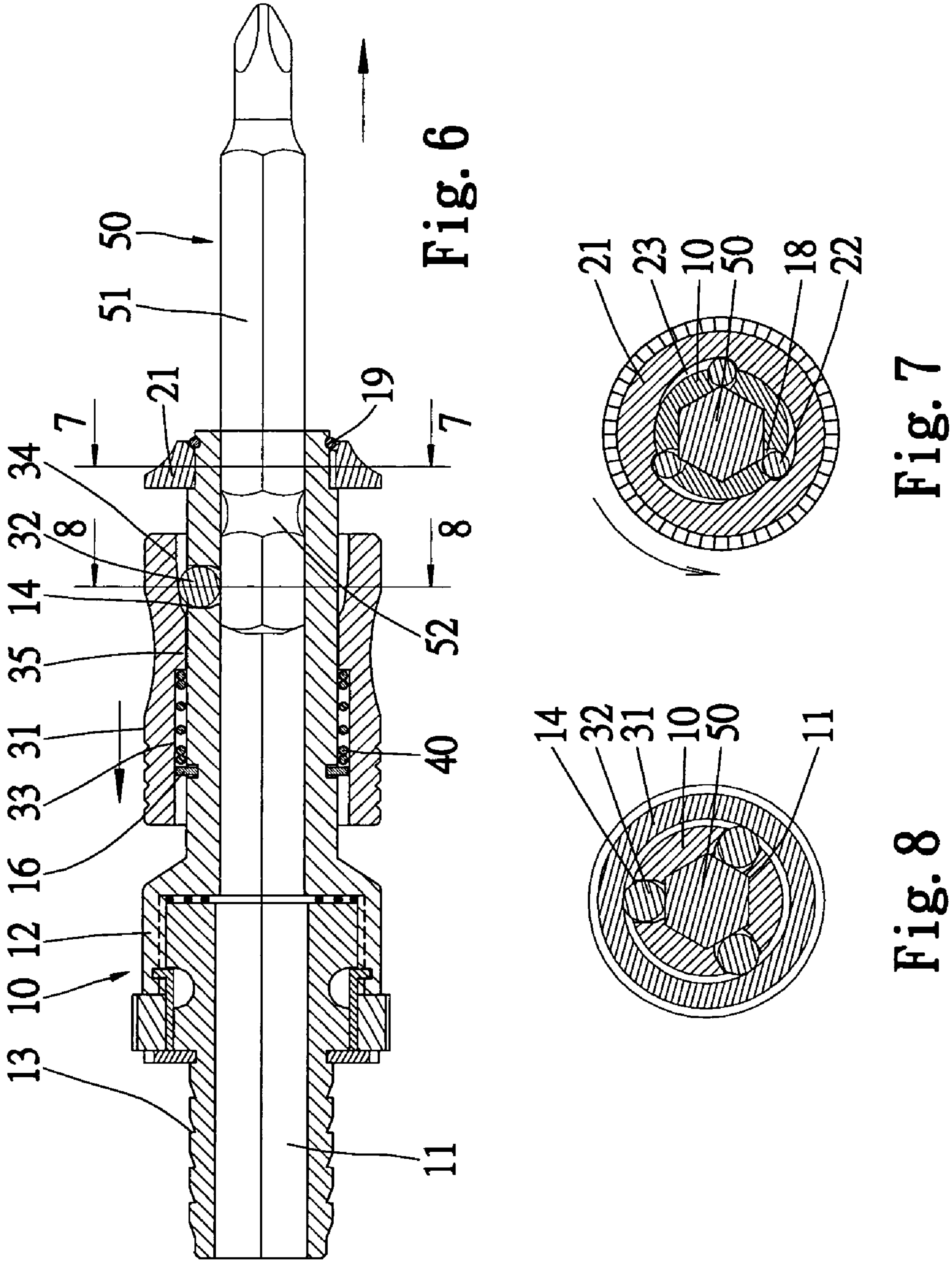
FIG. 6 is similar to FIG. 3 but shows the tool joint in a different position.
FIG. 7 is a cross-sectional view taken along a line 7—7 in FIG. 6.
FIG. 8 is a cross-sectional view taken along a line 8—8 in FIG. 6.

Referring to FIGS. 6 and 8, the collar 31 is moved rectilinearly on the socket 12 in order to move the frustum-shaped section 34 from the balls 32. Thus, the balls 32 are allowed to leave the annular groove 52.

Referring to FIG. 7, the ring 21 is rotated on the socket 12 in order to move the slopes 23 from the balls 22. Thus, the balls 22 are allowed to leave the shank 51 of the bit 50.

As the collar 31 is in the position shown in FIGS. 6 and 8 and the ring 21 is in the position shown in FIG. 7, the shank 51 of the bit 50 can be disengaged from the joint.

Figure 9:
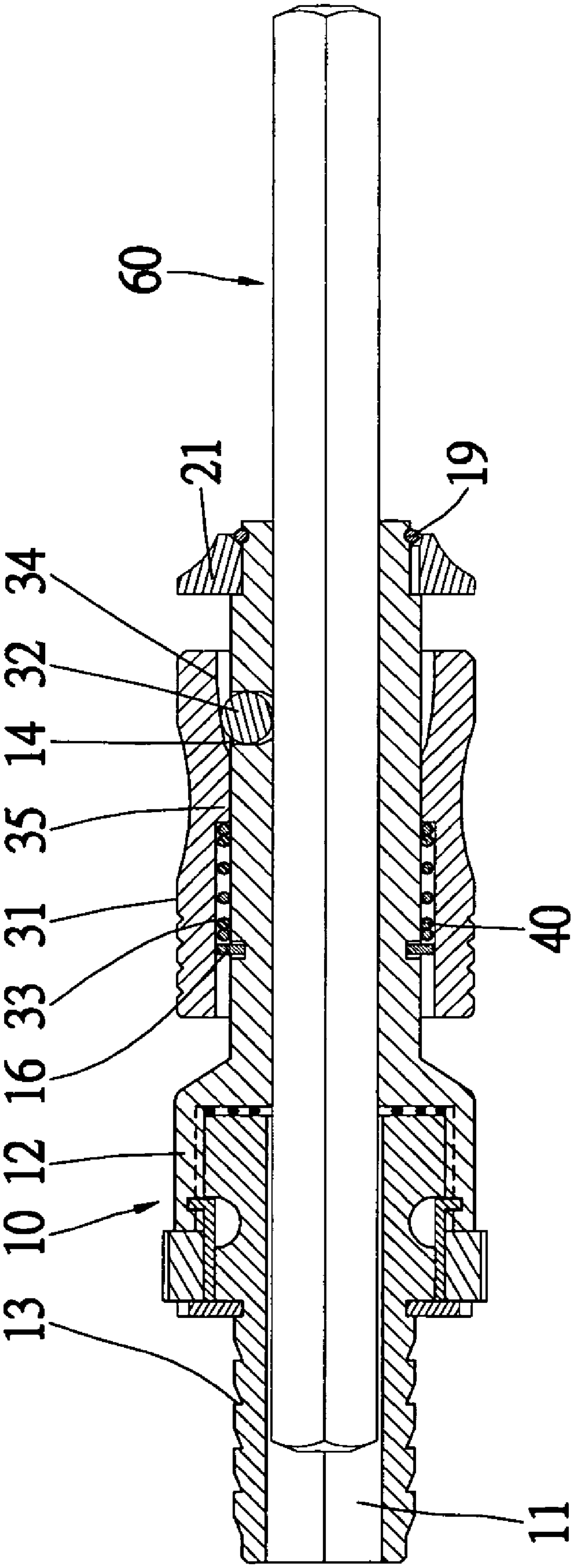
FIG. 9 is similar to FIG. 3 but shows the tool joint connected with a longer bit.

Referring to FIG. 9, the tool joint is connected with a bit 60. The bit 60 is longer than the bit 50. The bit 60 does not include annular groove like the annular groove 52 of the bit 50. The balls 32 contact the bit 60.

Figure 10:
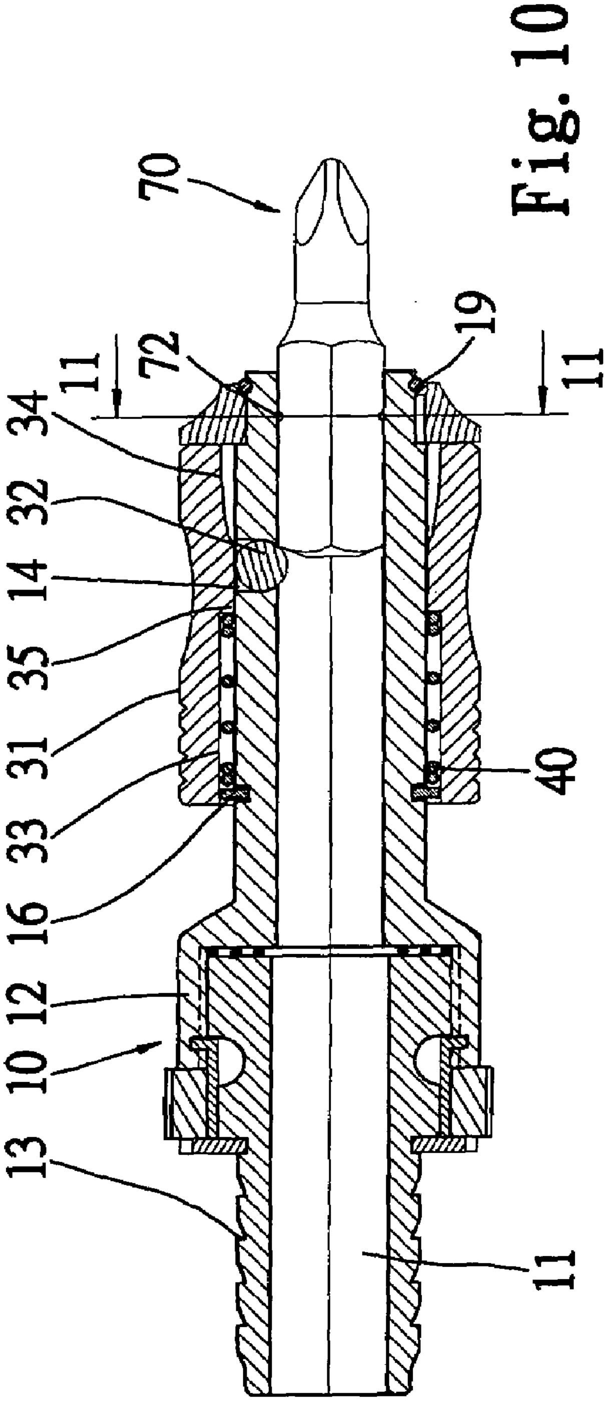
FIG. 10 is similar to FIG. 3 but shows the tool joint connected with a shorter bit.
Figure 11:
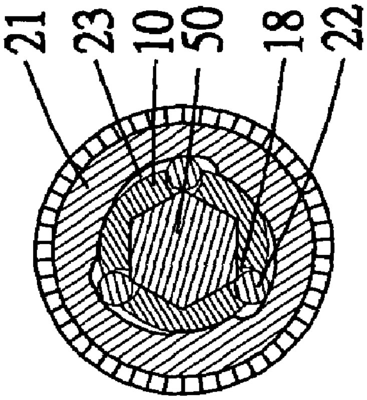
FIG. 11 is a cross-sectional view taken along a line 11—11 in FIG. 10.

Referring to FIG. 10, the tool joint is connected with a bit 70. The bit 70 is shorter than the bit 50. The balls 32 abut an end of the bit 70 in order to prevent the bit 70 from completely entering the axial passage 11. The bit 70 does not include an annular groove like the annular groove 52 of the bit 50. The bit 70 includes three recesses 72 that are, however, too small for the balls 22. The balls 22 contact the bit 70.

Figure 12:
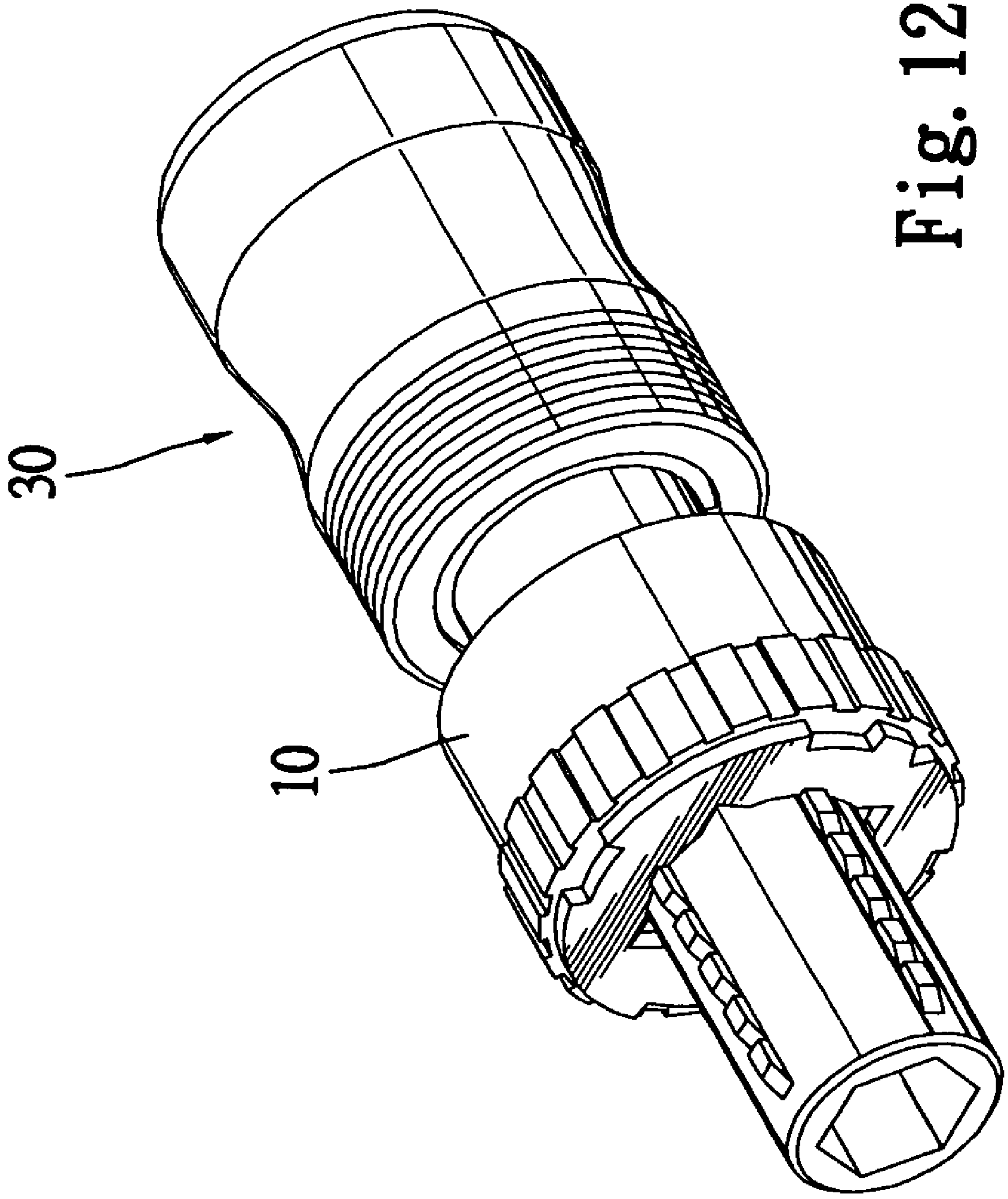
FIG. 12 is a perspective view of a tool joint according to a second embodiment of the present invention.
Figure 13:
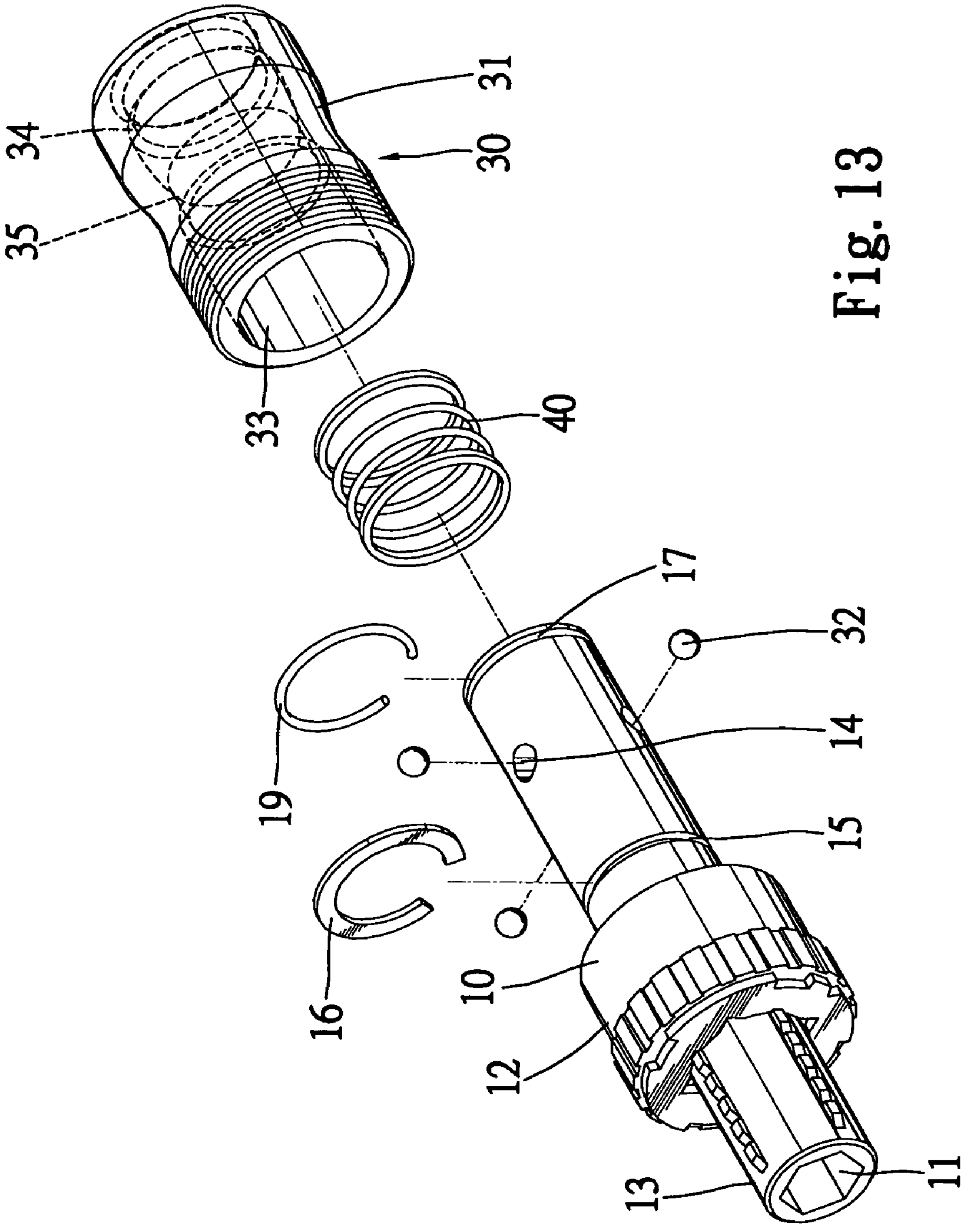
FIG. 13 is an exploded view of the shown in FIG. 12.
Figure 14:
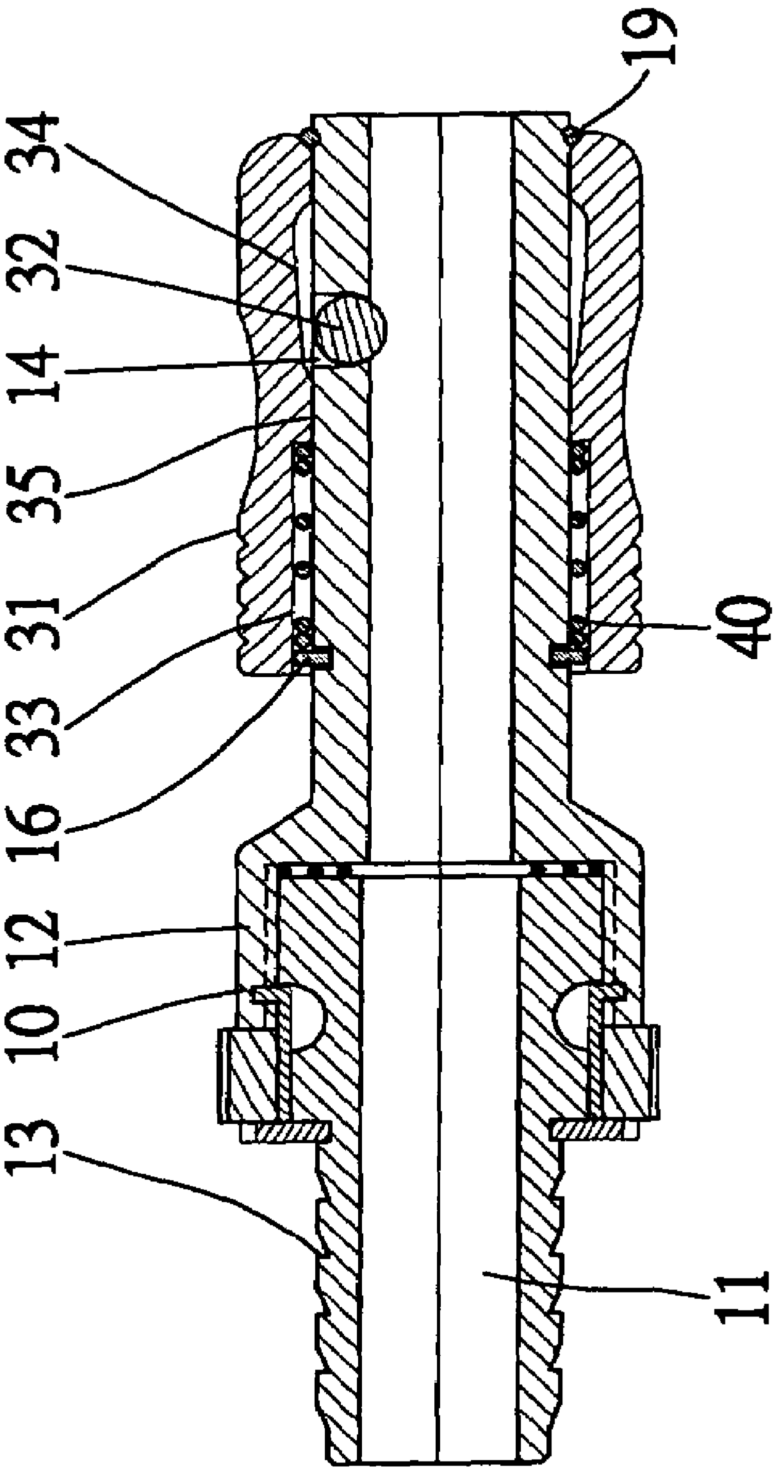
FIG. 14 is a cross-sectional view of the shown in FIG. 12.

Referring to FIGS. 12 through 14, a tool joint according to a second embodiment of the present invention is shown. The second embodiment is identical to the first embodiment except for not including the first locking device 20.

Figure 15:
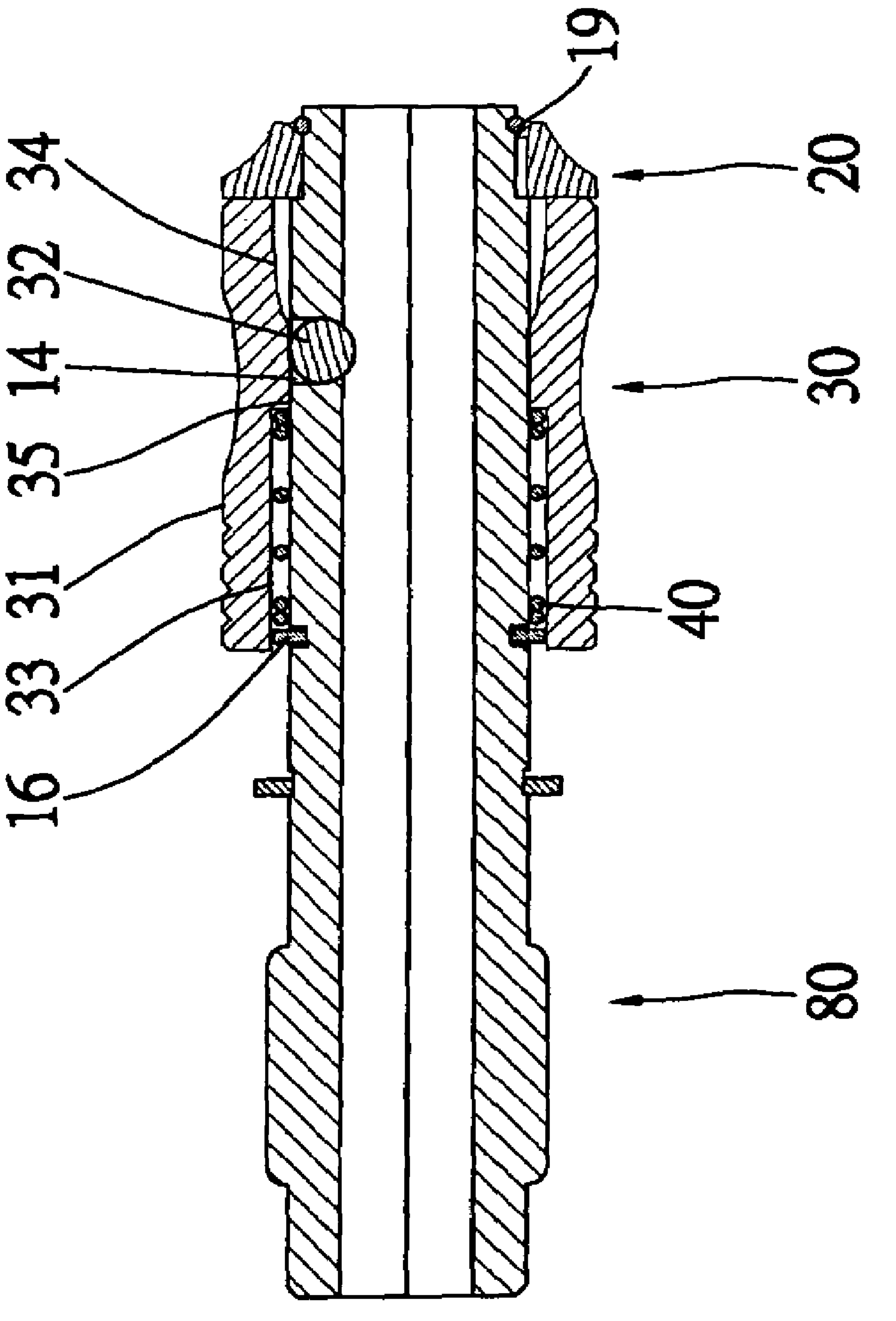
FIG. 15 is a cross-sectional view of a tool joint according to a third embodiment of the present invention.

Referring to FIG. 15, a tool joint according to a third embodiment of the present invention is shown. The third embodiment is identical to the first embodiment except for including socket 80 instead of the selective one-way socket 12.

Figure 16:
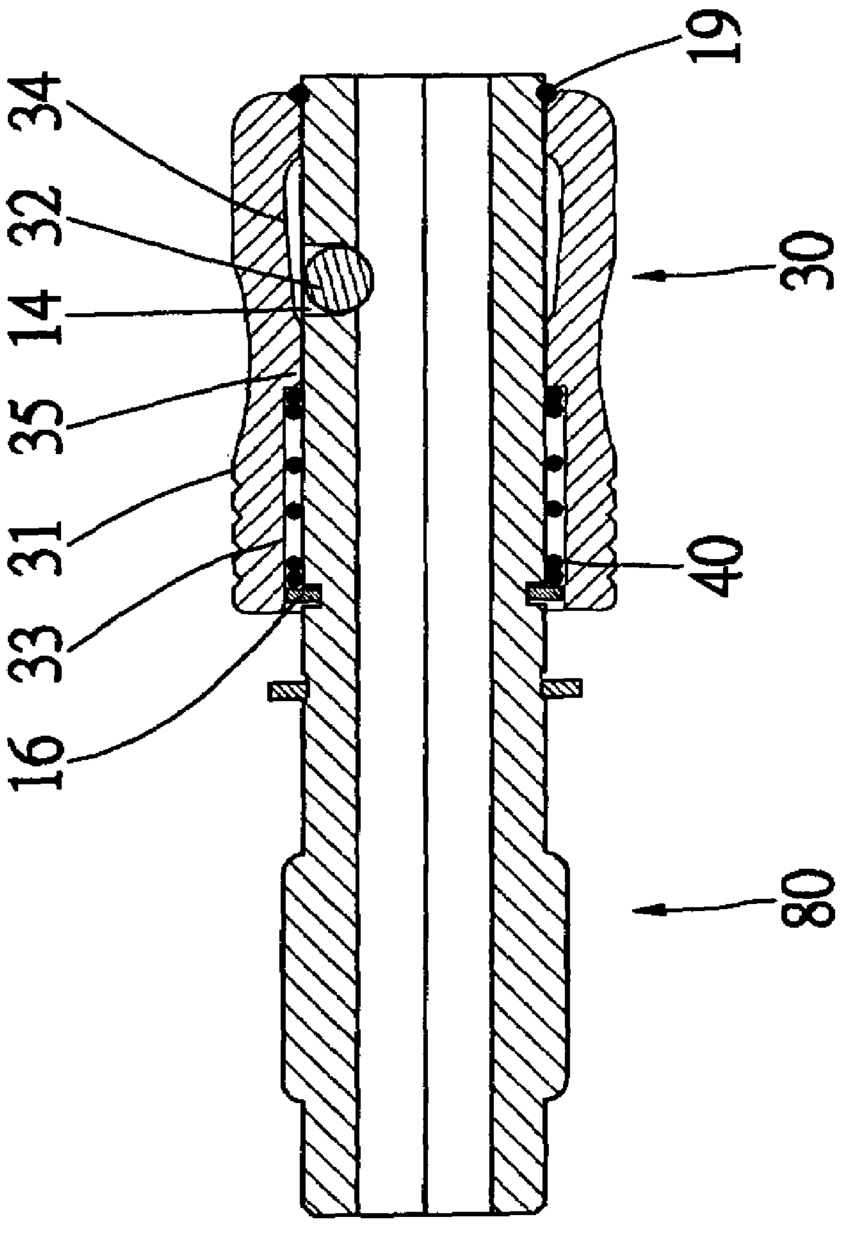
FIG. 16 is a cross-sectional view of a tool joint according to a fourth embodiment of the present invention.

Referring to FIG. 16, a tool joint according to a fourth embodiment of the present invention is shown. The fourth embodiment is identical to the first embodiment except for not including the first locking device 20 and for including socket 80 instead of the selective one-way socket 12.

An advantage of the joint of the present invention is that it can connect the handle with long and short bits. Another advantage of the joint of the present invention is that it can connect the handle with some bits with two locking devices.

The present invention has been described via detailed illustration of the embodiments. Those skilled in the art can derive variations from the embodiments without departing from the scope of the present invention. Therefore, the embodiments shall not limit the scope of the present invention defined in the claims.

What is claimed is:

1. A combination comprising at least a first bit and a joint for connecting a handle with the at least first bit; with the bit comprising:

a shank having an axis and an outer periphery, and an indent formed on the outer periphery of the shank, with the indent having an axial extent: with the joint comprising:

an insert fit in the handle, a socket connected with the insert and comprising an axial passage for receiving the shank, a plurality of first apertures communicated with the axial passage, a plurality of second apertures communicated with the axial passage and axially spaced from the plurality of first apertures, a first locking device installed on the socket and comprising a plurality of first detents put in the plurality of first apertures for abutment against the outer periphery and for removable receipt in the indent, with the first locking device further comprising a collar installed on the socket for controlling the plurality of first detents, a second locking device installed on the socket, wherein the second locking device comprises a plurality of second detents put in the plurality of second apertures for abutment against the shank and for removable receipt in the indent, with the second locking device further comprising a ring installed on the socket for controlling the plurality of second detents, and a C-clip installed on the socket for restraining the ring, with the axial extent of the indent allowing locking receipt of one of the plurality of first and second detents against axial movement of the at least first bit in the socket of the joint.

2. The combination according to claim 1 wherein the plurality of first detents are balls.

3. The combination according to claim 1 wherein the collar can be moved between a locking position and a releasing position.

4. The combination according to claim 3 wherein the collar comprises an internal side comprising an annular shoulder for pushing the plurality of first detents into the axial passage of the socket in the locking position and a frustum-shaped section for receiving the plurality of first detents in order to allow the plurality of first detents to leave the axial passage of the socket in the releasing position.

5. The combination according to claim 4 wherein the frustum-shaped section of the internal side of the collar is defined through rotation of a curve.

6. The combination according to claim 4 wherein the first locking device comprises an elastic element for biasing the collar to the locking position.

7. The combination according to claim 6 wherein the elastic element is compressed between the annular shoulder of the collar and the socket.

8. The combination according to claim 7 wherein the collar comprises a cylindrical section formed on the internal side for shielding the elastic element.

9. The combination according to claim 7 comprising another C-clip installed on the socket for abutment against the elastic element.

10. The combination according to claim 9 wherein the socket comprises an annular groove for receiving the other C-clip.

11. The combination according to claim 1 wherein the plurality of first and second detents are balls.

12. The combination according to claim 11 wherein the ring can be rotated between a locking position and a releasing position.

13. The joint combination according to claim 12 wherein the ring comprises an internal side and a plurality of slopes formed on the internal side for pushing the plurality of second detents into the axial passage of the socket in the locking position and for receiving the plurality of second detents in order to allow the plurality of second detents to leave the axial passage of the socket in the releasing position.

14. The combination according to claim 1 wherein the socket comprises an annular groove for receiving the C-clip.

15. The combination according to claim 1 wherein the socket is a selective one-way socket.

16. The combination according to claim 1 further comprising: a second bit, with the axial extent of the indent of the second bit being smaller than the axial extent of the indent of the first bit, with the axial extent of the plurality of second detents being greather than the axial extent of the indent of the second bit to prevent receipt therein.

17. The combination according to claim 16 wherein the indent of the second bit comprises circumferentially spaced recesses and the indent of the first bit comprises an annular groove, wherein the outer periphery and the axial passage have hexagonal cross sections.

18. The combination according to claim 1 wherein the indent is axially spaced from a free end of the shank, with the plurality of first detents received in the axial passage abutting with the free end of the shank when the plurality of second detents are aligned with the indent of the shank.

19. The combination according to claim 1 wherein the outer periphery and the axial passage have hexagonal cross sections.

* * * * *